US010625775B2

(12) United States Patent
Soerensen et al.

(10) Patent No.: US 10,625,775 B2
(45) Date of Patent: Apr. 21, 2020

(54) HYDRAULIC STEERING ARRANGEMENT

(71) Applicant: Danfoss Power Solutions ApS, Nordborg (DK)

(72) Inventors: Ole Soerensen, Nordborg (DK); Abdul Karim Rahimzai, Nordborg (DK); Niels Arbjerg, Nordborg (DK)

(73) Assignee: Danfoss Power Solutions ApS, Nordborg (DK)

(*) Notice: Subject to any disclaimer, the term of this patent is extended or adjusted under 35 U.S.C. 154(b) by 129 days.

(21) Appl. No.: 15/848,721

(22) Filed: Dec. 20, 2017

(65) Prior Publication Data

US 2018/0194392 A1 Jul. 12, 2018

(30) Foreign Application Priority Data

Jan. 6, 2017 (DE) .................. 10 2017 100 186

(51) Int. Cl.
| | |
|---|---|
| *B62D 5/065* | (2006.01) |
| *B62D 5/06* | (2006.01) |
| *B62D 5/07* | (2006.01) |
| *B62D 5/093* | (2006.01) |

(52) U.S. Cl.
CPC ............ *B62D 5/065* (2013.01); *B62D 5/062* (2013.01); *B62D 5/075* (2013.01); *B62D 5/093* (2013.01)

(58) Field of Classification Search
None
See application file for complete search history.

(56) References Cited

U.S. PATENT DOCUMENTS

| | | | | |
|---|---|---|---|---|
| 9,174,670 B2 * | 11/2015 | Bauer | ................... | B62D 5/093 |
| 9,550,521 B2 * | 1/2017 | Andersen | ............... | B62D 5/093 |
| 9,744,986 B2 * | 8/2017 | Young | ................... | B62D 5/093 |
| 9,744,990 B2 * | 8/2017 | Porskrog | ................ | B62D 5/075 |
| 2014/0298792 A1 * | 10/2014 | Andersen | ............... | B62D 5/093 60/433 |
| 2014/0374187 A1 * | 12/2014 | Arbjerg | .................. | B62D 5/093 180/441 |

FOREIGN PATENT DOCUMENTS

| | | |
|---|---|---|
| CN | 104326017 A | 2/2015 |
| CN | 106114609 A | 11/2016 |
| CN | 106143602 A | 11/2016 |
| DE | 10252215 B3 | 10/2004 |
| EP | 2610138 A1 | 7/2013 |
| EP | 2786915 B1 | 5/2016 |
| WO | 2004043768 A1 | 5/2004 |

OTHER PUBLICATIONS

First Examination Report for Indian Serial No. 201714036011 dated Oct. 25, 2019.

* cited by examiner

*Primary Examiner* — Jacob D Knutson
*Assistant Examiner* — Harold Eric Pahlck, III
(74) *Attorney, Agent, or Firm* — McCormick, Paulding & Huber PLLC

(57) ABSTRACT

A hydraulic steering arrangement (2) is described having a main flow path (8) with a flow meter (9) and an amplification flow path (10) opening into the main flow path (8) at a connecting point (11) located between the flow meter (9) and a working port arrangement (L, R). Such a steering arrangement should have in a simple way a large flow of the hydraulic fluid to the working port arrangement. To this end pressure increasing means (17) are arranged in the main flow path (8) upstream the connecting point (11).

16 Claims, 1 Drawing Sheet

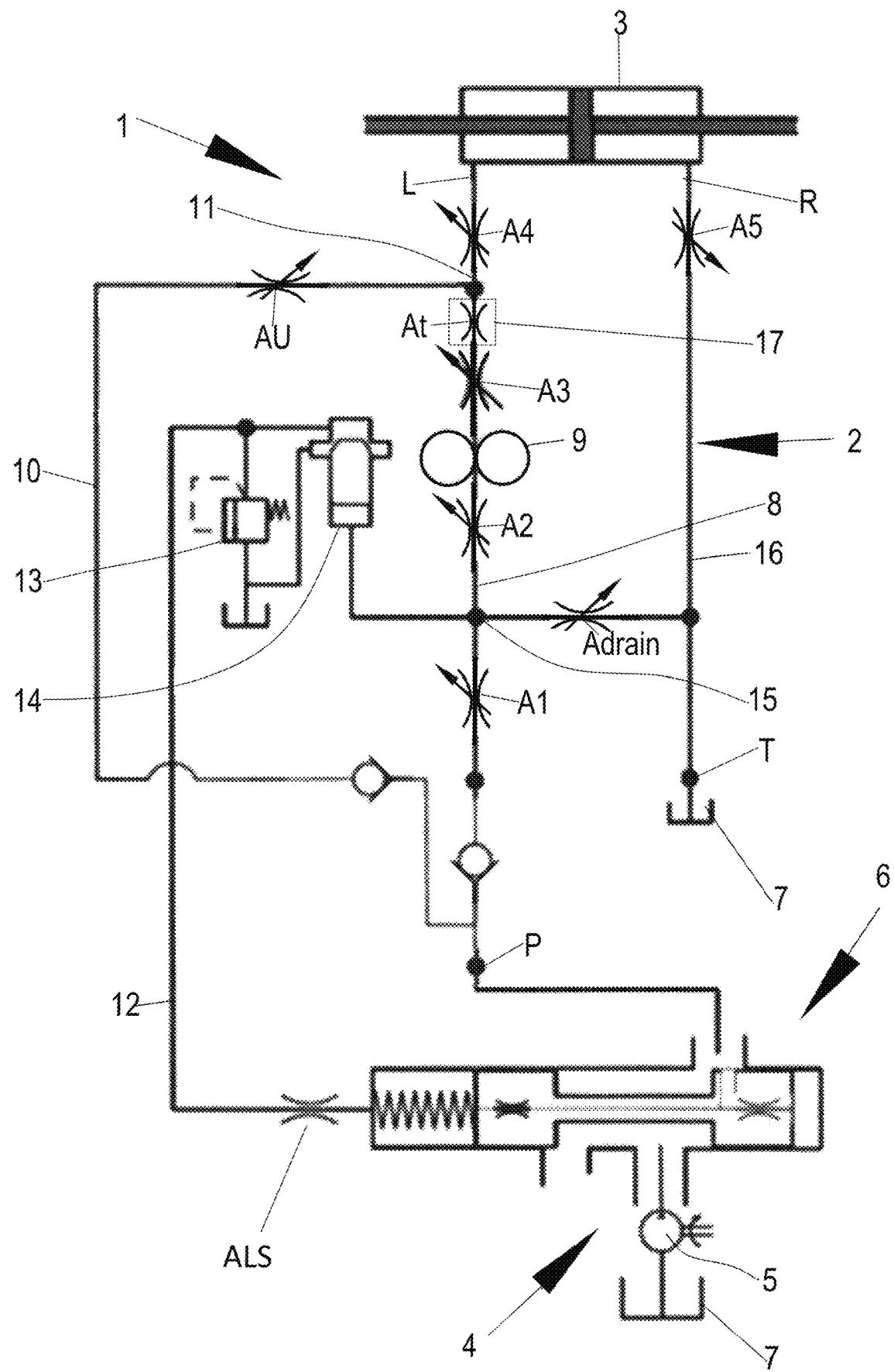

HYDRAULIC STEERING ARRANGEMENT

CROSS-REFERENCE TO RELATED APPLICATION

This application claims foreign priority benefits under U.S.C. § 119 to German Patent Application No. 10 2017 100 186.7 filed on Jan. 6, 2017, the content of which is hereby incorporated by reference in its entirety.

TECHNICAL FIELD

The present invention relates to a hydraulic steering arrangement having a main flow path with a flow meter and an amplification flow path opening into the main flow path at a connecting point located between the flow meter and a working port arrangement.

BACKGROUND ART

Such a steering arrangement is known, for example, from EP 2 786 915 B1.

When a vehicle equipped with such a steering arrangement is steered, the driver turns a steering wheel (or any other command means). By turning the steering wheel two elements, in particular a spool and a sleeve, are moved relatively to each other to open a number of orifices in the main flow path. This allows a certain amount of hydraulic fluid to pass the main flow path. This hydraulic fluid drives the flow meter which in turn restores the initial relative positions of the two elements. Therefore, when the steered wheels have reached the position commanded by the steering wheel the main flow path is closed again.

In order to deliver more hydraulic fluid to the steering motor connected to the working port arrangement the amplification flow path is used. In the amplification flow path an orifice, so called amplification orifice, is arranged which is opened and closed in synchronism with the orifices in the main flow path. Therefore, an additional flow proportional to the flow through the main flow path can be guided through to the amplification flow path. However, even with such a hydraulic steering arrangement it is in some cases difficult to satisfy the requirements of a desired steering velocity. In particular, when a steering motor connected to the working port arrangement has a big displacement, like in big articulated steered vehicles, it is difficult to supply the necessary amount of hydraulic fluid to the steering motor.

SUMMARY

An object underlying the invention is to have in a simple way a large flow of hydraulic fluid to the working port arrangement.

This object is solved with a hydraulic steering arrangement as described at the outset in that pressure increasing means are arranged in the main flow path upstream the connecting point.

When the flow path comprises pressure increasing means the pressure drop between a supply port and the connecting point is increased. This pressure drop drives the hydraulic fluid through the main flow path. The same pressure drop drives the hydraulic fluid through the amplification flow path as well. The higher the pressure drop is, the more hydraulic fluid is driven through the amplification flow path so that at the end a larger amount of hydraulic fluid is supplied to the working port arrangement.

In an embodiment of the invention the pressure increasing means are located downstream the flow meter. In other words, the pressure increasing means are located between the flow meter and the connecting point.

In an embodiment of the invention the pressure increasing means are located downstream a flow meter orifice. In many cases two flow meter orifices are located near the flow meter, one flow meter orifice upstream and one flow meter orifice downstream the flow meter. When the pressure increasing means are located downstream the flow meter orifice, it is kept outside of the neighborhood of the flow meter.

In an embodiment of the invention the pressure increasing means are located upstream the last orifice in the main flow path. The combined flow through the main flow path and through the amplification flow path is controlled by the last orifice.

In an embodiment of the invention the pressure increasing means are in form of a flow resistance. When hydraulic fluid passes the flow resistance, a certain pressure is necessary to drive the hydraulic fluid through the flow resistance. The higher the flow resistance is, the greater is the pressure needed. This pressure is supplied by a pressure source, for example, a hydraulic pump driven by the motor of the vehicle. This pump is in many cases pressure controlled or, in an alternative, pressure control means are arranged between the pump and the steering arrangement. When the pressure or the flow resistance has to be increased, a higher pressure from the pump is used.

In an embodiment of the invention the flow resistance is in form of an orifice. This is a simple way to realize a hydraulic flow resistance.

In an embodiment of the invention the orifice is a variable orifice.

In an embodiment the flow resistance of the variable orifice changes proportionally with a change of flow resistance of a main orifice in the main flow path.

In an alternative embodiment of the invention the orifice is a fixed orifice.

BRIEF DESCRIPTION OF THE DRAWINGS

An embodiment of the invention will now be described in more detail with reference to the drawing, wherein the only FIGURE is a schematic illustration of a hydraulic steering arrangement.

DETAILED DESCRIPTION

A hydraulic steering 1 of a vehicle comprises a hydraulic steering arrangement 2, a steering motor 3 and a pressure source 4. The pressure source 4 comprises a pump 5 and/or a priority valve 6 which makes it possible to adjust the pressure delivered by the pressure source 4. The pump 5 is connected to a tank 7. Hydraulic fluid returning from the steering motor 3 is guided back to the tank 7.

The hydraulic steering arrangement 2 comprises a main flow path 8 in which a flow meter 9 and a number of orifices are arranged.

In a direction from the pressure source 4 to the steering motor 3 there is a main orifice A1, a first flow meter orifice A2 upstream the flow meter 9, a second flow meter orifice A3 downstream the flow meter 9 and a further orifice A4 upstream the steering motor 3.

An amplification flow path 10 runs parallel to the main flow path 8 and opens into the main flow path 8 at a connecting point 11 arranged upstream the last mentioned orifice A4. An amplification orifice AU is arranged in the amplification flow path 10.

A load sensing line 12 is connected to the priority valve 6 via an orifice ALS. The load sensing line 12 is connected to the tank 7 by means of an overpressure valve 13.

Furthermore, a control valve 14 is arranged within the load sensing line 12 throttling a flow through the load sensing line 12 from a point 15 between the main orifice A1 and the first flow meter orifice A2 to the tank. The degree of throttling is determined by a control pressure within said steering arrangement 2. This control pressure is in the present embodiment the pressure at the mentioned point 15 between the main orifice A1 and the first flow meter orifice A2.

The steering arrangement 2 comprises a working port arrangement L, R, a supply port P and a return port T. The FIGURE shows a situation in which the left working port L is supplied with hydraulic fluid and fluid returning from the steering motor 3 is returned via the right working port R and a return line 16 to tank. A variable orifice A5 is arranged in the return line 16. A further variable orifice Adrain is arranged between the return line 16 and point 15 between the main orifice A1 and the first flow meter orifice A2. However, it depends on the direction of rotation of a steering wheel or the like which of the two working ports L, R is receiving hydraulic fluid under pressure and which of the working ports R, L is returning hydraulic fluid back to the tank 7.

Furthermore, pressure increasing means 17 are arranged in the main flow path 8 upstream the connecting point 11 and downstream the flow meter 9, in particular downstream the second flow meter orifice A3. The pressure increasing means 17 are in form of a flow resistance. A simple way to realize such a flow resistance is the use of an orifice At. In the present embodiment this orifice At is a fixed orifice. It is, however, also possible to use a variable orifice in which the opening degree and therefore the flow resistance depends on the opening degree and the flow resistance of the main orifice A1, for example.

When the steering wheel (not shown) or any other command means to steer a vehicle is in a neutral position, all variable orifices except the drain orifice Adrain are closed. The drain orifice Adrain is open. When the steering wheel is turned, the main orifice A1 is opened and the drain orifice Adrain is closed. Furthermore, the other variable orifices A2, A3, A4, A5, AU are opened. Hydraulic fluid entering the flow meter 9 moves the flow meter 9 which in turn restores the orifices A1-A5, Adrain and Au to their initial condition.

Hydraulic fluid passing the main flow path 8 has to pass through the pressure increasing means 17 as well. The pressure increasing means 17 increase a pressure drop between the supply port P and the connecting point 11. This pressure drop is as well responsible for driving the hydraulic fluid through the amplification path 10. The higher this pressure drop is, the more hydraulic fluid is driven through to the amplification flow path 10. The increase of pressure in the main flow path 8 at point 15 is sensed by the load sensing line 12 which will transmit this increased pressure to the priority valve 6. The priority valve 6 increases the pressure coming from the pump 5 and being supplied to the pressure port P.

The connecting point 11 in which the amplification flow path 10 opens into the main flow path 8 is located before the last orifice A4 so that the flow of hydraulic fluid through the amplification flow path 10 is influenced by the last orifice A4.

The orifices A4, A5 are dimensioned such that they are able to deal with the larger flow of hydraulic fluid, i.e. with the combined flow of the main flow path 8 and of the amplification flow path 10.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. A hydraulic steering arrangement having a main flow path with a flow meter, an amplification flow path opening into the main flow path at a connecting point located between the flow meter and a working port arrangement and a load sensing line, wherein pressure increasing means are arranged in the main flow path upstream the connecting point and the load sensing line senses an increase in the pressure in the main flow path, wherein the pressure increasing means are in form of a flow resistance, wherein the flow resistance is in form of an orifice, wherein the orifice is a variable orifice, and wherein a flow resistance of the variable orifice changes proportionally with a change of flow resistance of a main orifice in the main flow path.

2. The steering arrangement according to claim 1, wherein the pressure increasing means are located downstream the flow meter.

3. The steering arrangement according to claim 2, wherein the pressure increasing means are located downstream of a flow meter orifice.

4. The steering arrangement according to claim 3, wherein the pressure increasing means are located upstream a last orifice in the main flow path.

5. A hydraulic steering arrangement having a main flow path with a flow meter, an amplification flow path opening into the main flow path at a connecting point located between the flow meter and a working port arrangement and a load sensing line, wherein pressure increasing means are arranged in the main flow path upstream the connecting point and the load sensing line senses an increase in the pressure in the main flow path, wherein the pressure increasing means are in form of a flow resistance, wherein the flow resistance is in form of an orifice, and wherein the orifice is a fixed orifice.

6. The steering arrangement according to claim 5, wherein the pressure increasing means are located downstream the flow meter.

7. The steering arrangement according to claim 5, wherein the pressure increasing means are located downstream of a flow meter orifice.

8. The steering arrangement according to claim 5, wherein the pressure increasing means are located upstream a last orifice in the main flow path.

9. A hydraulic steering arrangement having a main flow path with a flow meter and an amplification flow path opening into the main flow path at a connecting point located between the flow meter and a working port arrangement wherein pressure increasing means are arranged in the main flow path upstream the connecting point, wherein the pressure increasing means are in form of a flow resistance, wherein the flow resistance is in form of an orifice, wherein the orifice is a variable orifice, and wherein a flow resistance of the variable orifice changes proportionally with a change of flow resistance of a main orifice in the main flow path.

10. The steering arrangement according to claim 9, wherein the pressure increasing means are located downstream the flow meter.

11. The steering arrangement according to claim 9, wherein the pressure increasing means are located downstream of a flow meter orifice.

12. The steering arrangement according to claim 9, wherein the pressure increasing means are located upstream a last orifice in the main flow path.

13. A hydraulic steering arrangement having a main flow path with a flow meter and an amplification flow path opening into the main flow path at a connecting point located between the flow meter and a working port arrangement wherein pressure increasing means are arranged in the main flow path upstream the connecting point, wherein the pressure increasing means are in form of a flow resistance, wherein the flow resistance is in form of an orifice, and wherein the orifice is a fixed orifice.

14. The steering arrangement according to claim 13, wherein the pressure increasing means are located downstream the flow meter.

15. The steering arrangement according to claim 13, wherein the pressure increasing means are located downstream of a flow meter orifice.

16. The steering arrangement according to claim 13, wherein the pressure increasing means are located upstream a last orifice in the main flow path.

* * * * *